United States Patent
Fahimi et al.

(12) 
(10) Patent No.: US 6,295,181 B1
(45) Date of Patent: Sep. 25, 2001

(54) TAPE BEARING SURFACE WITH REDUCE TAPE CONTACT AND METHOD OF MAKING SAME

(75) Inventors: Aboutorab S. Fahimi, Bloomington; Durkee B. Richards, Stillwater, both of MN (US); Leif O. Erickson, River Falls, WI (US)

(73) Assignee: Imation Corp., Oakdale, MN (US)

( * ) Notice: Subject to any disclaimer, the term of this patent is extended or adjusted under 35 U.S.C. 154(b) by 694 days.

(21) Appl. No.: 08/665,167

(22) Filed: Jun. 14, 1996

(51) Int. Cl.⁷ .................................................. G11B 15/60
(52) U.S. Cl. ................................. 360/130.21; 226/196.1
(58) Field of Search ............................. 360/130.21, 93, 360/130.22, 130.23, 130.24; 226/196.1

(56) References Cited

U.S. PATENT DOCUMENTS

| | | | |
|---|---|---|---|
| 3,393,849 | * | 7/1968 | Hass .................................. 226/194 |
| 4,114,751 | * | 9/1978 | Nordin .............................. 400/248 |
| 4,736,904 | * | 4/1988 | Schoettle et al. .................. 242/615 |
| 5,282,105 | * | 1/1994 | Eaton et al. .................. 360/130.21 |
| 5,299,756 | * | 4/1994 | Hu et al. ......................... 242/346.1 |
| 5,358,193 | | 10/1994 | Madsen et al. .................... 242/342 |
| 5,377,927 | | 1/1995 | Erickson et al. .................. 242/346 |
| 5,490,029 | | 2/1996 | Madsen et al. .................... 360/132 |
| 5,513,815 | | 5/1996 | Erickson et al. .................. 242/346 |

* cited by examiner

Primary Examiner—William Klimowicz
(74) Attorney, Agent, or Firm—Eric D. Levinson (57) ABSTRACT

A tape bearing surface for a tape that reduces tape surface contact near the edge, while minimizing variation in cross-web tension, and a method of making the same. The tape surface piece has a longitudinal axes defining a tape path and a lateral axis is perpendicular to the longitudinal axis along a top surface. The top surface defines a convex shape having at least one distinct radii extending along the lateral axis. In one embodiment, the convex shape is elliptical or parabolic. In one embodiment, two distinct radii are formed so that a first radius proximate a center of the lateral axis is greater then a second radius proximate edges of the lateral axis. The present invention is also directed to a tape guide and a tape cartridge containing the present tape bearing surface.

18 Claims, 11 Drawing Sheets

TAPE BEARING SURFACE WITH REDUCE TAPE CONTACT AND METHOD OF MAKING SAME

FIELD OF THE INVENTION

The present invention relates to a stationary tape guide with improved flight characteristics, and more particularly, to a tape bearing surface that reduces tape surface contact near the edge, while minimizing variation in cross-web tension, and a method of making the same.

BACKGROUND OF THE INVENTION

Tape surface damage near the edge of the tape is a leading cause of data loss and tape cartridge failure. Additionally, tape contact with tape guides can contribute to debris generation and to a malformed tape pack. Large radius stationary cylindrical tape guides have been frequently used to transport tape with minimal physical tape-to-guide contact, and in particular, to reduce tape surface contact near the edge with the tape guide.

The use of a flying tape guide helps to reduce the tape-to-guide friction and consequently tape wear. A flying tape guide causes the tape to fly (at specific tape speed and tension) over the bearing surface of the tape guide. When operated at the designed speed and tension, there is almost no physical contact between the moving tape and the stationary tape guide. At lower tape speeds or higher tape tension, however, tape lift is reduce and there is generally tape surface contact pressure along the tape edges.

Figure 1:
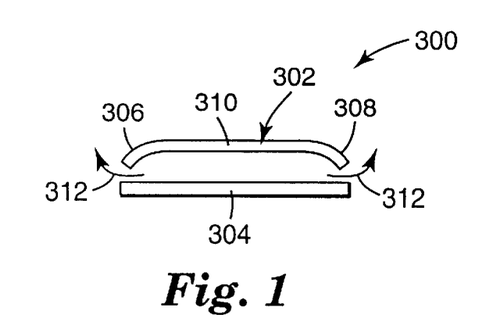
FIG. 1 is a schematic profile illustrating the spacing between the tape and a straight tape bearing surface for a flying tape guide.

Flying tape guides, however, do not necessarily prevent tape surface contact at the edges. FIG. 1 is a schematic end view of a flat flying tape guide 300. The cross-web tension is generally uniform over the length of the guide 304. Under constant tape tension, however, the spacing between moving tape 302 and stationary tape guide 304 is not uniform across the width of the tape 302. The spacing along edges 306, 308 of the tape 302 is generally less then the spacing near the center 310 due to atmospheric pressure acting on the tape edge 306, 308, anti-clastic tape deformation and side leakage 312 of the air bearing surface. The problem of tape edge damage will become more severe as the magnetic tape industry moves to thinner media where the cross-web bending rigidity of the tape is significantly reduced.

In both belt-driven and hub-driven tape cartridges, the allowable tape speed and storage capacity (i.e., data density) increase with the accuracy at which the tape is coupled with the read/write heads. Therefore, any solution to the problem of tape edge damage that alters tape-to-head interface will likely have a direct impact on tape drive performance. For example, tape cartridges must meet minimum tape tension specifications while simultaneously maintaining minimum drive force specifications. The tape tension must not fall below a certain level as the tape passes from reel to reel. Otherwise, contact between the read/write head and the tape will be insufficient. The minimum achievable tape tension should be sufficiently high to ensure proper cartridge operation. Similarly, the maximum required frictional drive force should be as low as possible to enhance cartridge operation within the power limitations of the drive motor. Thus, there is a limitation on the frictional drive force. The frictional drive force is that portion of the drive force which affects power loss at the interface between the backside of the tape and the tape guide. Minimizing the frictional drive force and improving tape tracking can be accomplished by minimizing the friction at the interface between the tape and the tape guides, which accounts for approximately one-third of the drive force in a data cartridge.

SUMMARY OF THE INVENTION

The present invention is directed to a stationary tape bearing surface with reduced tape surface contact near the edge, while minimizing variation in cross-web tension. The present invention is also directed to a stationary tape guide and a tape cartridge containing the present tape bearing surface. The present invention is also directed to a method of making a tape guide with these characteristics.

The stationary tape bearing surface for a tape guides has a tape surface piece with a top surface. The top surface has a longitudinal axes defining a tape path and a lateral axis perpendicular to the longitudinal axis. In one embodiment, the top surface defines a convex shape extending along the lateral axis having at least two distinct radii.

The two distinct radii include a first radii proximate a center of the lateral axis and a second radii proximate edges of the lateral axis. The first radius is preferably greater then the second radius. The first radius preferably has a height in the range of 6.0 to 8.0 microns. The second radius preferably has a height in a range of about 19 to 21 microns. The tape surface piece may be cold rolled stainless steel or chrome plated brass. In an alternate embodiment, the top surface defines a convex shape with a single radius of curvature extending along the lateral axis having a height of between 12.7 to 25.4 microns (0.0005 and 0.001 inches), more preferably between 12.7 and 20.3 microns and most preferably between 17.8 and 20.3 microns. In the preferred embodiment, the top surface is configured so that a self-acting air bearing is formed at the interface between the tape and the bearing surface.

The present invention is also directed to a tape guide including a stationary, convex tape bearing surface. The present invention is also directed to a tape cartridge including the stationary, convex tape bearing surface.

The present invention is also directed to a method of forming a tape bearing surface for a tape. A tape surface piece having a top surface with a longitudinal axis defining a tape path and a lateral axis perpendicular to the longitudinal axis is provided. The top surface is formed into a convex shape extending along the lateral axis having at least two distinct radii. The at least two distinct radii include a first radii proximate a center of the lateral axis and a second radii proximate edges of the lateral axis The first radius is preferably greater then the second radius.

In an alternate embodiment, the tape bearing surface defines a single radius having a height of between 12.7 to 25.4 microns (0.0005 and 0.001 inches), more preferably between 12.7 and 20.3 microns and most preferably between 17.8 and 20.3 microns.

The method also includes the steps of stamping the tape surface piece from sheet stock. The stamping process typically forms a burr edge along a bottom surface of the tape surface piece. The bottom surface of the stamped tape surface piece is then cold rolling to form the tape bearing surface. The step of forming the top surface typically involves using a calendering roller.

As used herein:

Curved profile or crown refers to a cross-sectional profile perpendicular to the tape path.

Self-induced Air Bearing (also known as hydrodynamic lift) refers to a layer of air or air film carried by the tape into the interface between the tape and the tape guide, absent any external artificial source of air pressure.

DETAILED DESCRIPTION OF THE PREFERRED EMBODIMENTS

Figure 2:
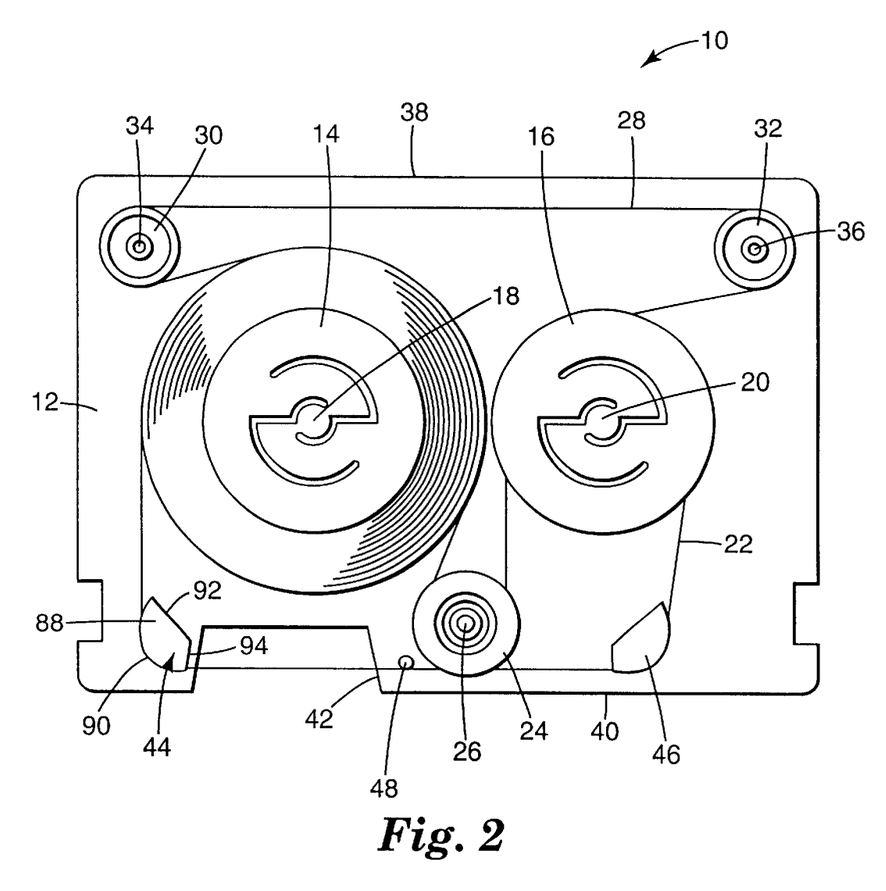
FIG. 2 is a top view of an exemplary belt driven, data tape cartridge with the cover removed incorporating tape bearing surfaces according to the present invention.

FIG. 2 illustrates an exemplary data cartridges 10 for use in a recording and/or reproducing machine, known as a tape drive (not shown). The tape drive typically includes a support frame including a horizontal cartridge support deck which supports a magnetic transducer or recording head, and in a depending manner, supports a reversible drive motor. The shaft of the drive motor extends through and carries a drive roller above the support deck. Guides position the cartridge on the support deck. It will be understood that the present tape guide may be used with a wide variety of tape cartridges and may also be used directly on tape drives that include tape handling features.

As shown in FIG. 2, the cartridge 10 includes a base plate 12 and a cover (not shown). Two tape reels 14, 16 are mounted for rotation on respective tape reel pins 18, 20 pressed into the base plate 12, within the cartridge 10. The magnetic tape 22 is driven from reel to reel via a drive system including a drive roller 24 which is mounted for free rotation on a drive roller pin 26. The drive roller 24 drives a driving belt 28 which winds around corner guide rollers 30, 32 and the tape reels 14, 16. The guide rollers 30, 32 guide the driving belt 28 and are rotatably mounted on guide roller pivot pins 34, 36 mounted at opposite corners of the cartridge base plate 12 along a back edge wall 38 parallel to the front edge wall 40. The front edge wall 40 has a cutaway portion 42 for access to the magnetic tape 22 by the magnetic recording head. A door (not shown) closes the cutaway portion 42 when the cartridge 10 is not in use. An opening (not shown) extends into the front edge wall 40 to provide access for the drive roller of the tape drive.

The driving belt 28 is thin, continuous, flexible, and elastic. It extends along the belt path around the drive roller 24 and the corner guide rollers 30, 32 and contacts the tape 22 on the tape reels 14, 16. The un-stretched length of the driving belt 28 is less then the length of the belt path. Thus, when the belt 28 is stretched around the guide path it generates a belt tension which provides a frictional engagement force or side load between the guide rollers 30, 32 and their respective pivot pins 34, 36 as well as between the belt 28 and the tape reels 14, 16. The frictional engagement force also presses the tape layers together to prevent slipping of adjacent tape layers wound on the tape reels 14, 16 and spilling of the tape 22 from the supply reel. Since the frictional engagement force is dependent on belt tension, the tape tension and drive force are dependent on the belt tension.

The guide rollers 30, 32 have a predetermined coefficient of friction to provide a predetermined frictional coupling between each guide roller 30, 32 and its pivot pin 34, 36. This frictional coupling applies a predetermined frictional drag to the driving belt 28 as it passes around the guide rollers 30, 32 to increase the tension of the belt 28 and provide the proper tension drop between the tape reels 14, 16.

Stationary tape guides 44, 46 also are located on the base plate 12 and guide the magnetic tape 22 to and from respective tape reels 14, 16. The tape guides 44, 46 are configured to create a self-acting air bearing (hydrodyanamic lift) in conjunction with tape motion. In particular, the boundary layer of air at the tape surface is carried into, or entrained, into the interface between the tape and the tape guides 44, 46, such as disclosed in U.S. Pat. No. 5,358,193 issued to Madsen et al. on Oct. 25, 1994. A guide pin 48 is disposed on the base plate 12 intermediate the two stationary tape guides 44, 46 and assists the tape guides 44, 46 in guiding the magnetic tape 22. No tape wrap pins or rollers are required, although they can optionally be used.

The tape 22 is convolutively wound on the tape reels 14, 16 in opposite directions. A tape guide path between the reels 14, 16 is defined by the tape guides 44, 46 and the tape guide pin 48. One tape guide 44 is positioned along the front edge wall 40 of the cartridge 10 on one side of the cutaway portion 42, and the other tape guide 46 and the guide pin 48 are positioned along the edge wall 40 on the opposite side of the cutaway portion 42.

Figure 3:
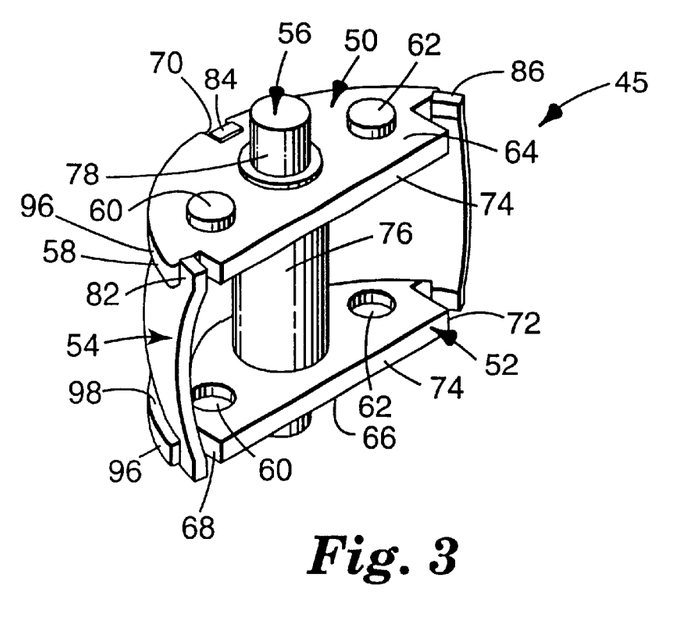
FIG. 3 is an exemplary tape guide suitable for use with the present tape bearing surface.
Figure 4:
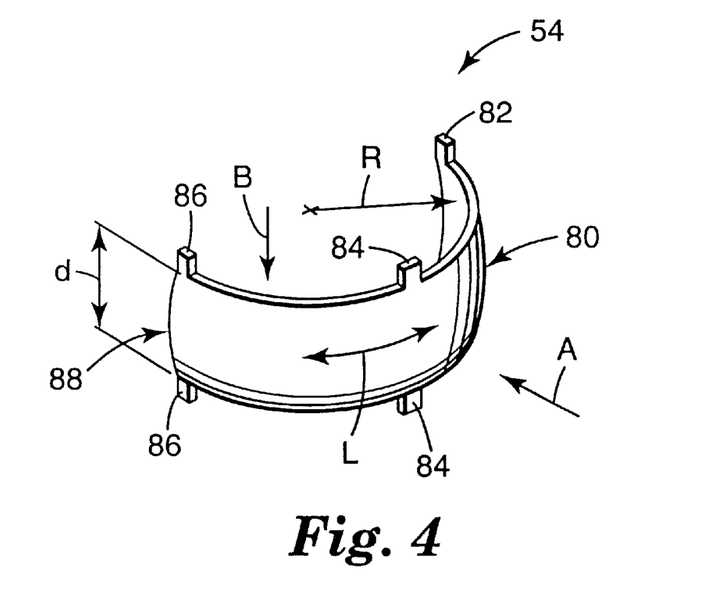
FIG. 4 is a perspective view of a tape surface piece according to the present invention.

FIGS. 3 and 4 illustrate various aspects of an exemplary stationary tape guide 45, suitable for use in the cartridge 10 as the tape guides 44 and 46. Top and bottom flange pieces 50, 52 are separated by a tape surface piece 54 and a post 56. The top flange piece 50 and the bottom flange piece 52 are preferably not identical. Each flange piece 50, 52 is generally semi-circular and can have a constant radius curved side. In the illustrated embodiments, the curved side 58 has a compound or varying radius.

Each flange piece 50, 52 is formed with two half-shears or buttons 60, 62. The bottom flange buttons 60, 62 position the tape guide 45 on the base plate 12 of the cartridge 10 and the top flange buttons 60, 62 position the tape guide 45 on assembly tools. The buttons 60, 62 on the top flange piece 50 project out of the top surface 64 of the flange piece 50 and the buttons 60, 62 on the lower flange piece 52 project out of the bottom surface 66 of the flange piece 52. The buttons 60, 62 on the lower flange piece 52 are received within openings in the base plate 12 to prevent rotation of the tape guide around the axis of the post 56. Additionally, each flange piece 50, 52 includes three notches 68, 70, 72, one adjacent each interface of the curved side 58 and a straight side 74 of the flange pieces, and one at the center of the curved side 58. The notches 68, 70, 72 secure the tape surface piece 54 to the tape guide 45.

The post 56 is cylindrical and includes a larger diameter central portion 76 which is disposed between the flange pieces 50, 52 and two smaller diameter end portions 78 which extend through the hole in the flange pieces 50, 52. The post 56 determines the height of the tape guide. The post 56 is press fit through the holes to improve the integrity of the assembly by maintaining the components of the assembled tape guide 45 in the required locations. The post 56 may also serve as a mounting component to mount the tape guide 45 to the base plate 12 of the cartridge 10. When assembled onto the tape guide 45, the tape surface piece 54 forms a stationary tape bearing surface 80 having a top profile that is substantially the same as the curvature of the flange pieces 50, 52. The tape bearing surface 80 extends along the longitudinal tape travel axis "L."

The lower tabs 82, 84, 86, can sit directly on the base plate 12 of the cartridge 10 to maintain the flanges parallel and to define the height of the tape guides. This also helps to maintain clearance between the bottom flange piece 52 and the base plate 12. This configuration loosens the precise manufacturing limits of the flange pieces 50, 52 and permits the flange pieces to be less precisely made. Loading the flanges 50, 52 during assembly biases the bottom flange piece 52 toward the top flange piece 50, removes any imprecisions, and flattens the flanges. The bearing surface of the tape guide 45 can form flanges 96 which are formed from the flange pieces 50, 52 and which constrain and guide the tape 22 within a trough 98.

Before it is formed with its curved radius "R" and the curved profile 88, the tape surface piece 54 is generally rectangular with three pairs of tabs 82, 84, 86 projecting out of the rectangle. The tabs 82, 84, 86 are received in respective notches 68, 70, 72 in the flange pieces 50, 52 when the tape guide 45 is assembled. The tape surface piece 54 acts as a type of leaf spring that is loaded when it is assembled between the flange pieces 50, 52. The tape surface piece 54 can be either underformed or overformed. In either instance, the tape surface piece 54 is bent against its internal biasing force when assembled to secure the tape surface piece 54 between the flange pieces 50, 52. When a force is applied in the direction indicated by A, the component can easily bend or form to create curves, angles, pre-stressed, or preforms for spring loading, as is described below. However, if a force is applied in the perpendicular direction indicated by B to the same piece, the rigidity of the piece in that plane can be used to fix positions, to hold tolerances, and to lock a spring. This approach was used as the guiding principle throughout the design of the stamped tape guide.

The assembly of the tape guide 45 from its component pieces can be totally automated and is a variation of what is called "watch plate construction." That is, the top and bottom flange pieces 50, 52 are keyed together by the tape surface piece 54 via the interlocking of the tabs 82, 84, 86 and the notches 68, 70, 72. In this configuration, the components are formed by stamping while yielding the same accuracy as machining and grinding. This assembled tape guide 45 can be made and assembled for approximately one-half of the cost of the current one piece tape guides when made in large volumes. It will be understood that the present invention is not limited to the exemplary tape guides disclosed herein. Other tape guide structures are disclosed in U.S. Pat. No. 5,377,927 entitled Tape Guide for a Data Cartridge, issued Jan. 3, 1995; U.S. Pat. No. 5,513,815 Tape Guide Module for a Data Cartridge, issued May 7, 1996; and U.S. Pat. No. 5,490,029 entitled Compliant Tape Guide for Data Cartridges, issued Feb. 6, 1996.

As best shown in FIG. 4, the width of the tape bearing surface 80 has a convex, curved profile extending along an axis "d" perpendicular to the longitudinal tape travel axis "L." The curved profile forms a generally uniform air bearing between the tape bearing surface 80 and the tape 22, thereby reducing friction. When used with a tape about 12.7 mm to 6.35 mm wide, and more preferably 8.0 mm wide, the curve or "crown" 88 preferably has a height of between 12.7 microns to 25.4 microns (0.0005 to 0.001 inches), more preferably between 12.7 microns and 20.3 (0.0005 to 0.0008 inches), and most preferably between 17.8 microns and 20.3 microns (0.0007 to 0.0008 inches). The tape has a thickness of between 7.6 to 8.9 microns, although tape thickness is continuously decreasing. The present tape bearing surface may be used with tapes less then 5.1 microns thick.

It will be understood that the height of the curved profile or crown will vary depending upon the thickness, width, and resiliency of the tape as well as other factors, although edge effect (side leakage of the air bearing) is believed to be the dominant factor in determining crown height and shape. For example, crown height will increase slightly with increasing tape width, but probably not in proportion to tape width. The radius of curvature of the crown, however, will increase to accommodate wider tape and decrease for narrower tape.

Figure 5A:
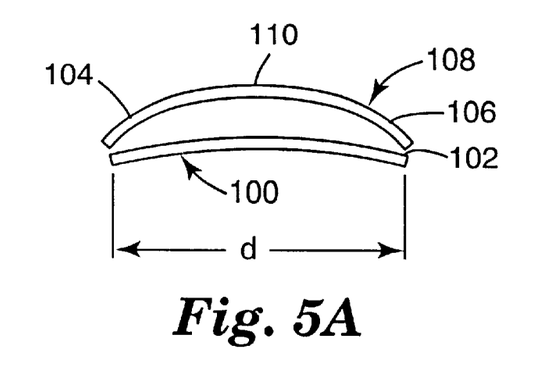
FIG. 5A is a schematic profile of the spacing between the tape and a curved tape bearing surface for a flying tape guide.

FIG. 5A is a schematic illustration of a tape bearing surface 102 with a single radius curved profile or crown 100. The crown 100 serves to move the edges 104, 106 of the tape 108 upward from the tape bearing surface 102 to reduce the chance that the tape will contact the tape bearing surface 102. Depending upon the height of the crown 100, intermittent edge contact 104, 106 with the tape bearing surface 102 is possible.

The curvature of the tape bearing surface 102 causes the tape 108 to stretch proximate the center portion 110. Consequently, the tape gap along the center portion 110 is greater then along the edges 104, 106. The differential in tape stretch along the axis "d" causes tape tension variation across the width of the tape, although the average tape tension remains constant. The non-uniform spacing results in less wrapping of the tape 108 around the tape bearing surface 102 along the direction "d." The actual tape deflection (or spacing) acts like a feedback system until the tape bending forces, Reynolds pressure, contact pressure and tape tension reach an equilibrium state.

Figure 5B:
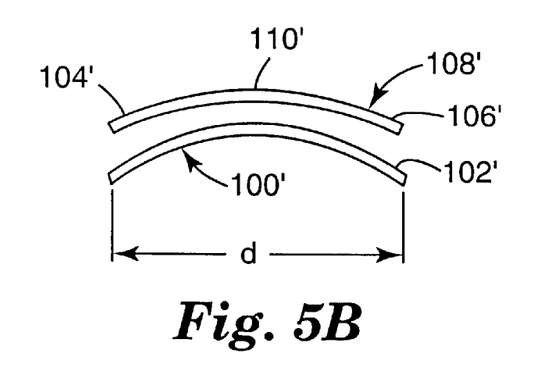
FIG. 5B is a schematic profile of the spacing between the tape and a curved tape bearing surface for a flying tape guide.

FIG. 5B is a schematic illustration of an alternate tape bearing surface 102' with a single radius crown 100'. The radius of the crown 100' is greater then the radius of the crown 100 of FIG. 5A, resulting in proportionately higher tape tension along the center portion 110'. The lower tape tension along the edges 104', 106' reduces the normal force, and thus, increases the flying height. The larger radius crown 100' results in a smaller gap along the center portion 110' and larger gaps at the edges 104', 106'. Although the larger radius crown 100' may eliminate edge contact 104', 106' with the tape bearing surface 102', the resulting increase in tension gradient across the width of the tape 108' may interfere with recording performance.

Figure 5C:
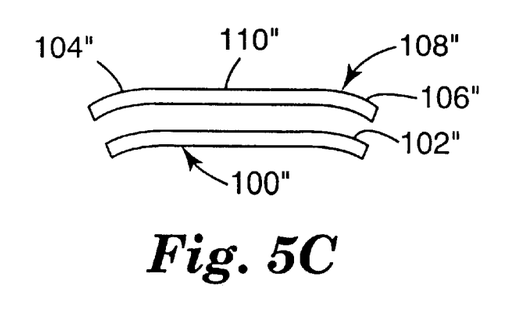
FIG. 5C is a schematic profile of the spacing between the tape and a multi-radius tape bearing surface for a flying tape guide.

FIG. 5C is a schematic illustration of an alternate tape bearing surface 102" with multiple radius. In particular, the radius of curvature of the tape bearing surface 102" is greater proximate the center portion 110" then near the tape edges 104", 106". The shape of the tape bearing surface 102" results in generally uniform spacing across the width of the tape 108" with minimal chance of tape surface contact near the edges 104", 106" contact with the bearing surface 102". Additionally, the shape of the tape bearing surface 102" causes less cross-web tension variation then the embodiment of FIG. 5B, as will be discussed below. The multi-radius embodiment of FIG. 5C represents a balance between the competing variables of cross-web tension variation and flying height.

Figure 6A:
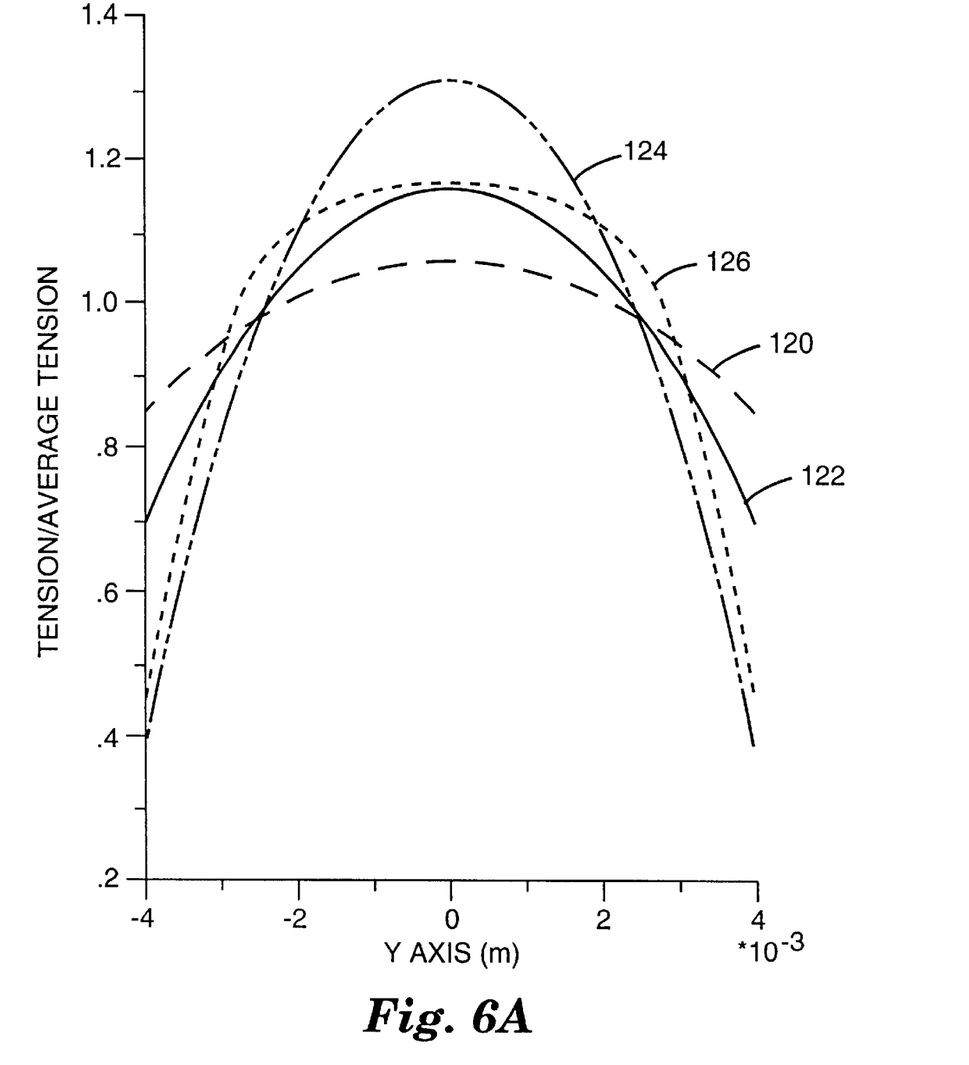
FIG. 6A is a graph of various ratios of tape tension to average tension across the width of a tape bearing surface with a curved profile.

FIG. 6A is a graph of tape tension/average tension on the vertical axis and the width of the tape on the horizontal axis for various crown heights. The horizontal axis corresponds to a tape 8.0 mm wide. Graph line 120 corresponds to a single radius tape bearing surface having a crown height of 5.08 microns (0.0002 inches). Graph line 122 corresponds to a single radius tape bearing surface having a crown height of 12.7 microns (0.0005 inches). The graph lines 120, 122 generally correspond to the embodiment of FIG. 5A, in which the cross-web tension gradient is relatively low, but the risk of tape surface contact near the edge with the tape bearing surface is greater then in the embodiments of FIGS. 5B or 5C.

The graph line 124 corresponds to a single radius tape bearing surface having a crown height of 24.4 microns (0.001 inches). The larger crown minimizes the risk of tape surface contact near the edge with the tape bearing surface. The cross-web tension gradient, however, is significantly higher then for a lower crown heights of graph lines 120 and 122.

Figure 6B:
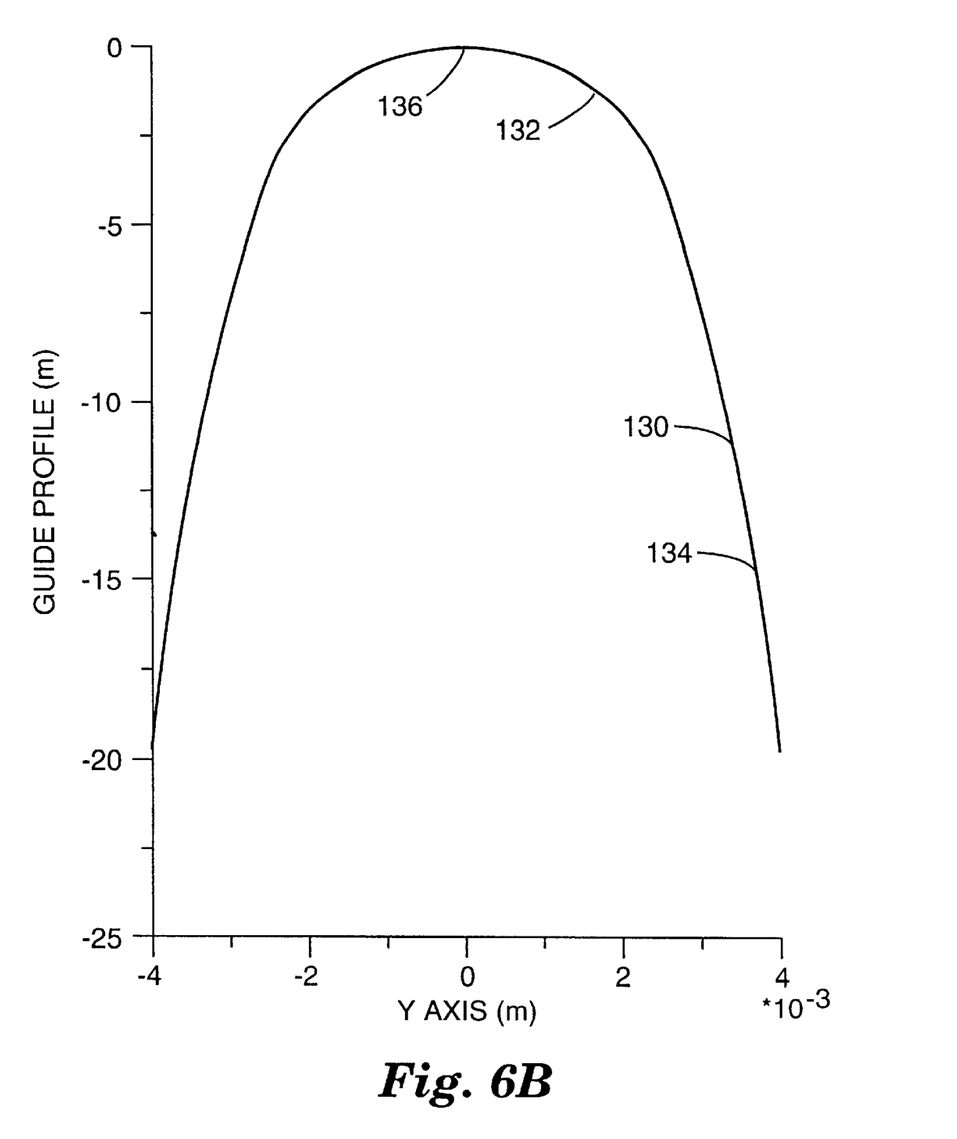
FIG. 6B is a graph of the curved profile of a tape bearing surface containing a plurality of distinct radii.

Graph line 126 corresponds to a tape bearing surface profile having multiple radii, such as illustrated in FIG. 6B. The graph line shows a relatively low cross-web tension variation for the center portion of the tape guide, corresponding to ±3 mm. Since the large center portion exhibits a low cross-web tension gradient, the increase in tension gradient along the edges (between ±3 and ±4 mm, respectively) is similarly low. Moreover, the tension gradient along the edges of the tape tends to decay during the free-span travel between the tape guide 44, 46 and the cutaway portion 42.

The tape bearing surface profile 130 shown in FIG. 6B has a first radius 132 and a second radius 134. The tape bearing surface profile 130 is a mirror image on either side of center 136. The first radius 132 extends from the center of the tape bearing surface 136 (width of ±2.0 mm) to a height of approximately 7.6 microns. The second radius 134 extends from ±2.0 mm to ±4.0 mm, respectively, to a height of approximately 20 microns at the edge of the tape bearing surface. It will be understood by those skilled in the art that a variety of multi-radii tape bearing surfaces are possible. For example, three or more radii may be desirable for some applications. Elliptical or parabolic tape bearing surface are preferred since they are more easily modeled and manufactured.

Figure 7:
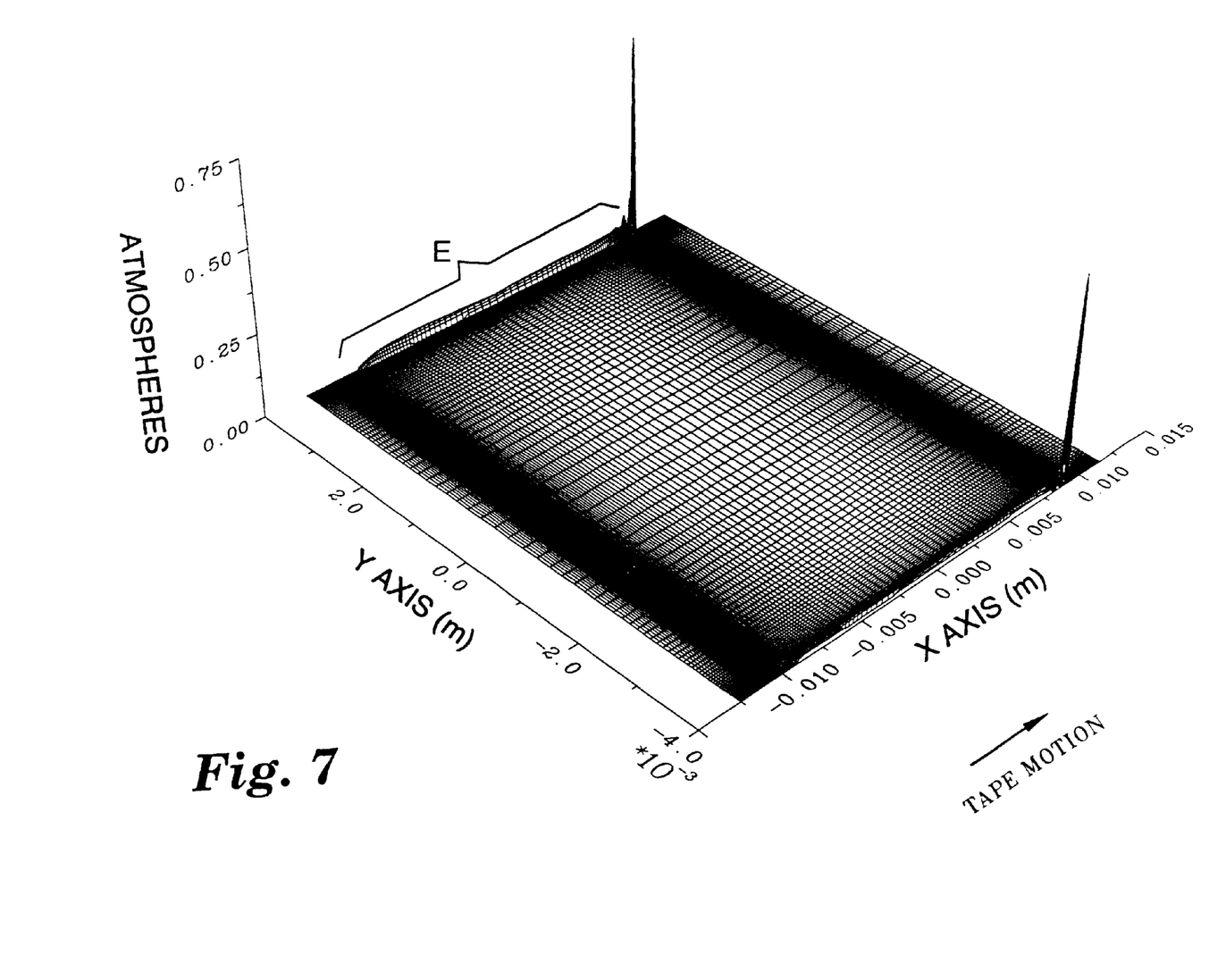
FIG. 7 is a three-dimensional view of the contact pressure of the tape across the surface of the tape bearing surface with a height of 5.08 microns.
Figure 8:
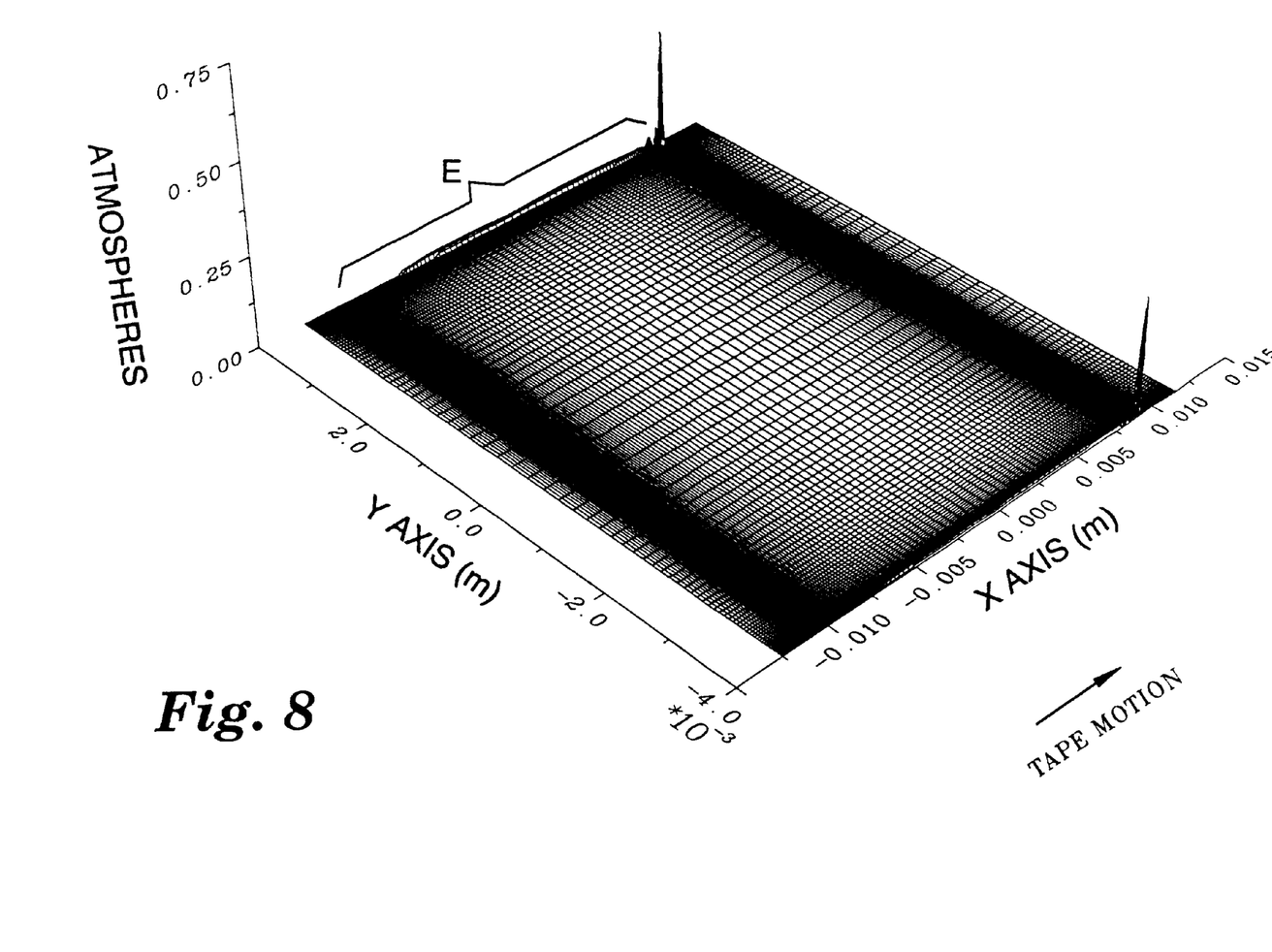
FIG. 8 is a three-dimensional view of the contact pressure of the tape across the surface of the tape bearing with a height of 12.7 microns.
Figure 9:
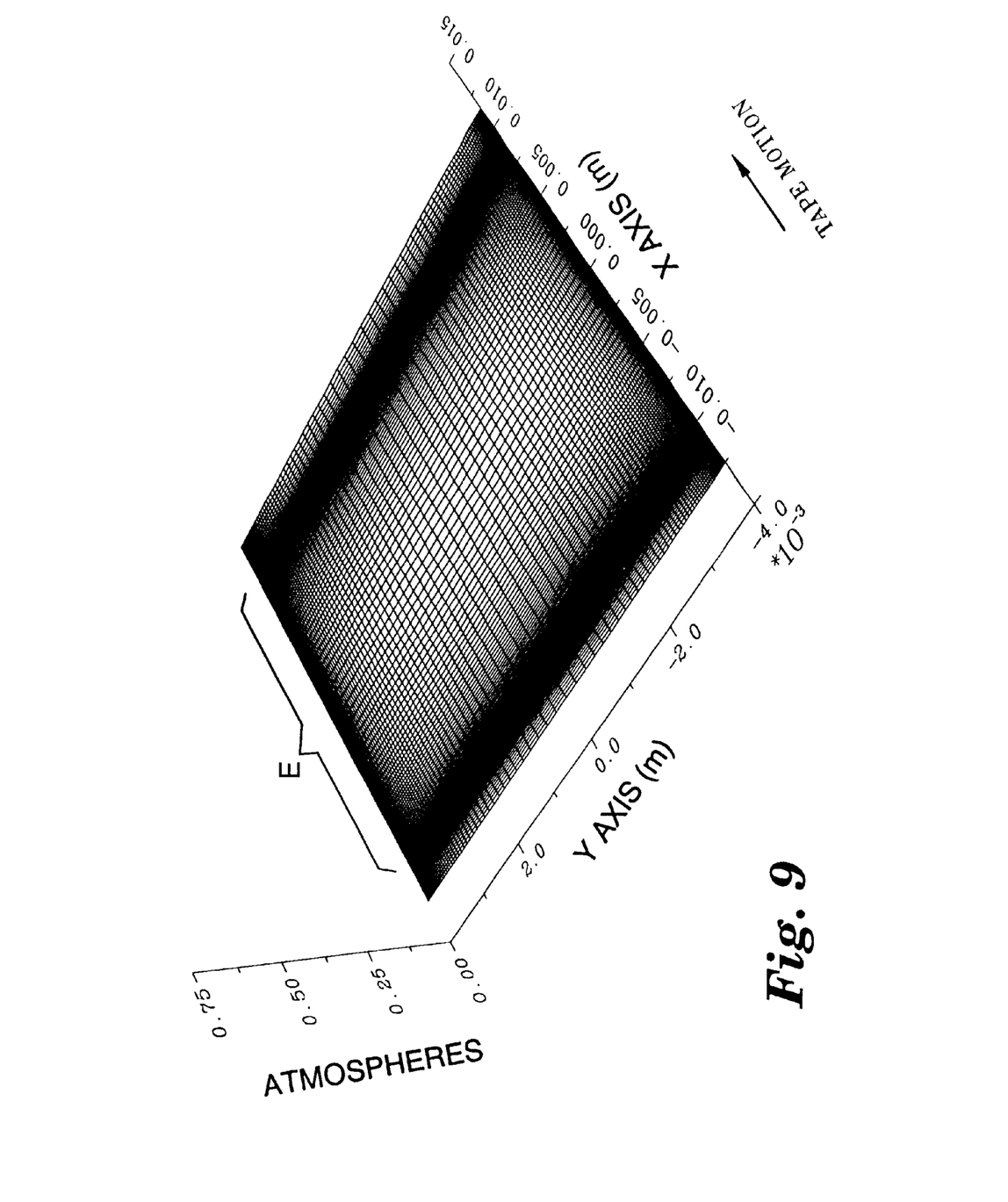
FIG. 9 is a three-dimensional view of the contact pressure of the tape across the surface of the tape bearing surface with a height of 25.4 microns.

FIG. 7 is a three-dimensional graph of the contact pressure across the entire surface of a single radius tape bearing surface with a height of 5.08 microns (0.0002 inches). The tape surface near the edges "E" of the tape width at ±4 mm (along the y-axis) show elevated levels of contact pressure. FIG. 8 is a three-dimensional graph of the contact pressure across the entire surface of a single radius tape bearing surface having a crown height of 12.7 microns (0.0005 inches). FIG. 8 shows a reduced level of contact pressure with the higher crown. FIG. 9 is a three-dimensional graph of the contact pressure across the entire surface of a single radius tape bearing surface 102 having a crown height of 24.4 microns (0.001 inches). The edges of the tape show virtually no contact pressure. The contact along the edges is progressively as the crown height is increased.

Figure 10A:
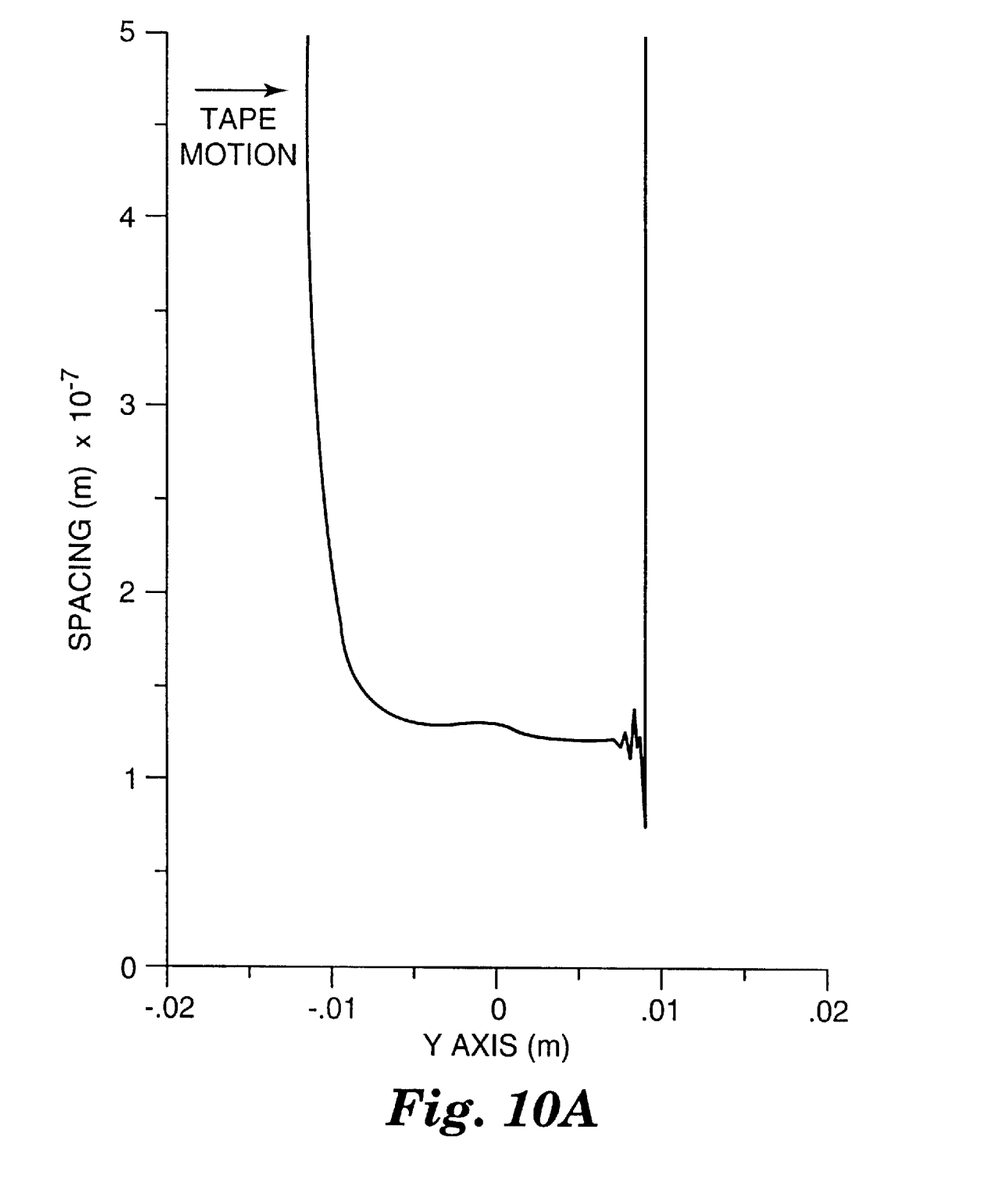
FIG. 10A is a graph of the spacing between the tape and the tape bearing surface along the edge of the tape for the tape bearing surface of FIG. 6A.
Figure 10B:
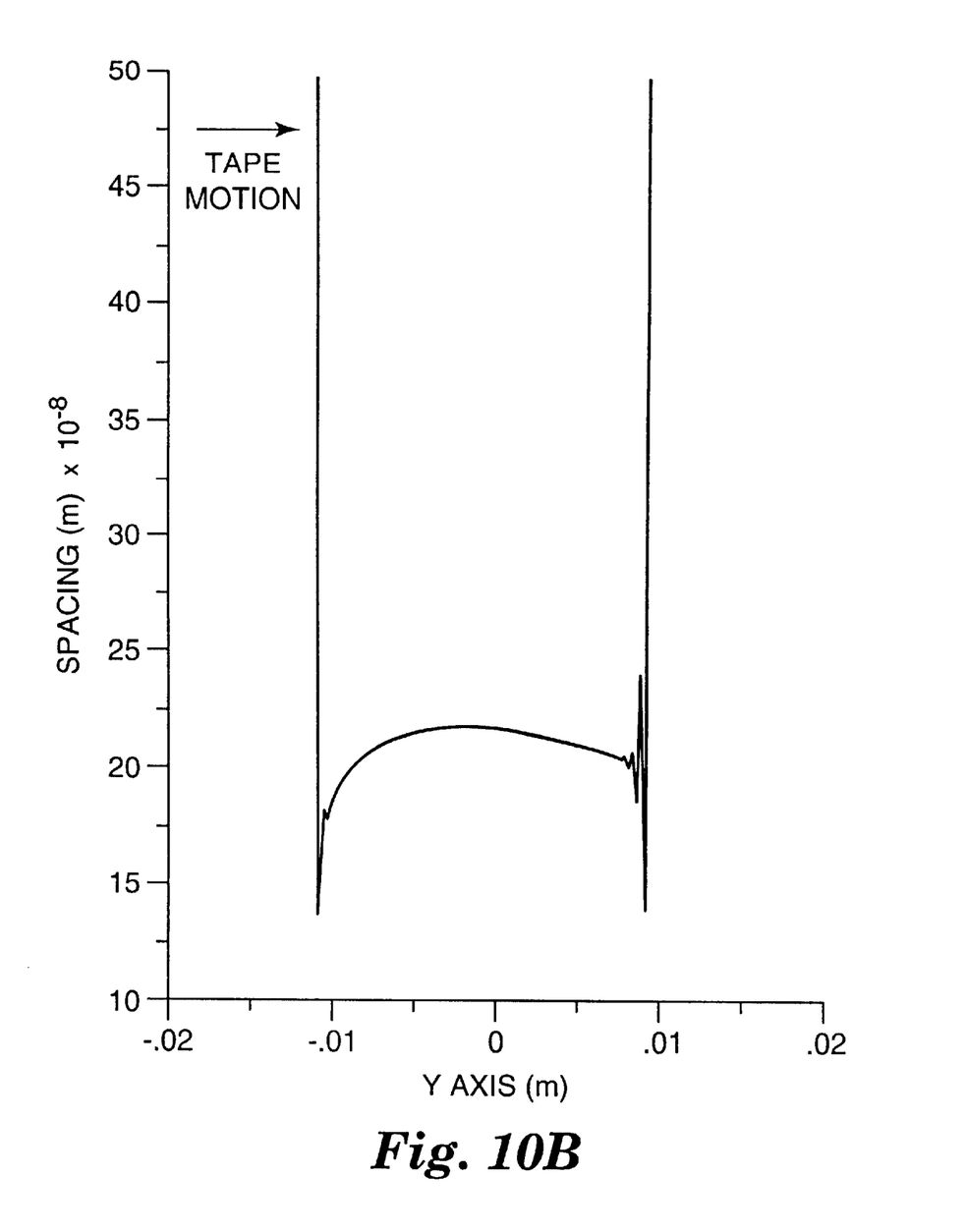
FIG. 10B is a graph of the spacing between the tape and the tape bearing surface along the center of the tape for the tape bearing surface of FIG. 6A.

FIG. 10A is a graph of the spacing between the tape and the tape bearing surface 130 along the edge of the tape. FIG. 10B is a graph of the spacing between the tape bearing surface 130 along the center of the tape. Both graphs reflect the spacing along the direction of travel of the tape. As shown in FIG. 10A, the spacing along the edge of the tape drops at the trailing edge of the tape bearing surface 130. Similarly, as shown in FIG. 10B, the spacing along the center of the tape drops proximate the leading and trailing edges of the tape bearing surface 130. Consequently, different techniques for manufacturing the leading and trailing edges are of interest for insuring that the tape will not come in contact with the tape bearing surface.

The inventors have found that drawbacks to mass producing machined one-piece three-dimensional stainless steel tape guides are reduced by using stamping or shearing technology and forming the tape guides of multiple components. Once the tooling is carefully accomplished, mass production is possible. Notwithstanding that conventional wisdom dictates that stamped or sheared metal parts are not adequate for very precise applications like cartridge tape guides, the inventors have recognized a property of a specific type and thickness of sheared metal parts that permits their use in precise applications.

Figure 11A:
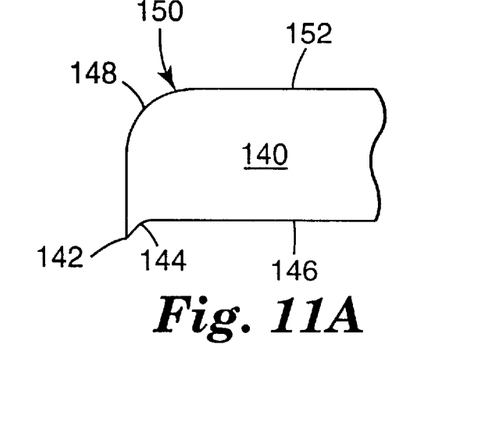
FIG. 11A is a schematic side view of a stamped tape surface piece before cold roll forming.

FIG. 11A illustrates a stamped tape surface blank 140. The tape surface piece 54 may be constructed of a variety of materials, such as stainless steel. In an alternate embodiment, the tape surface piece 54 is constructed of brass with an intermediate layer of nickel 0.051 microns (50 micro inches) thick underneath a top layer of chrome 1.27 microns (2 micro inches) thick.

A burr 142 is formed along bottom edge 144 of a bottom surface 146 during the stamping process due to die clearance. A die roll radius 148 is formed along edge 150 of a top surface 152. A fracture edge is formed at the end of the radius 148 during the stamping process. When stamping laminated materials, such as chrome plated brass, it is important to keep the fractured edge away from the tape. To accomplish this result, it is important to shear from the tape surface side. When doing so, it is important to maintain a die roll (radius 148) of 15 microns (0.006 inches), or less. In order to achieve a die roll 148 of 15 microns, the die clearance is preferably less then 7.6 microns (0.0003 inches). It will be understood that this phenomenon occurs around the entire perimeter of the tape surface blank 140, although only one edge is shown.

Figure 11B:
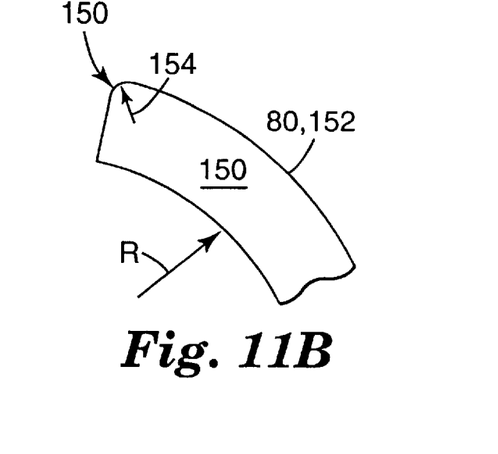
FIG. 11B is schematic side view of a tape surface piece of FIG. 11A with a curved profile according to the present invention after cold roll forming.

As illustrated in FIG. 11B, the tape surface blank 140 is then preferably cold rolled so that top surface 152 becomes the tape bearing surface 80 of the tape surface piece 54 (see FIG. 4). The tape surface blank 140 preferably has a radius of curvature "R" slightly lower than the predetermined final radius of curvature of the tape surface piece after assembly into a tape guide 45. During the cold rolling process, the tape surface blank 140 is compressed and thinned so that a radius 154 less then the radius 148 is formed. The radius 154 is typically less then 15 microns. It will be understood that a larger radius modifies the air bearing characteristics.

Figure 12A:
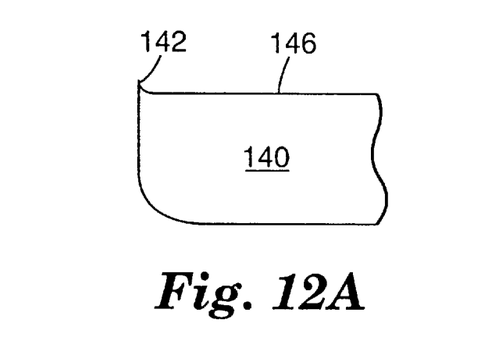
FIG. 12A is schematic side view of a stamped tape surface piece before cold roll forming.
Figure 12B:
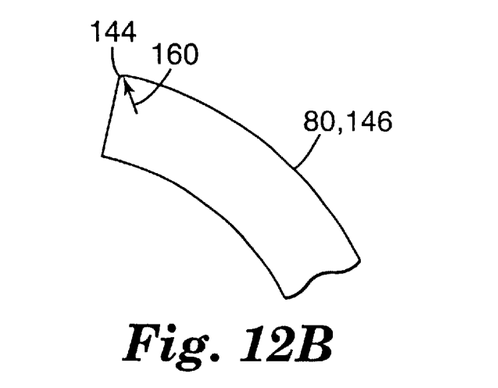
FIG. 12B is schematic side view of a tape surface piece with a curved profile according to the present invention after cold roll forming.

FIGS. 12A–12B illustrate an alternate manufacturing process in which the orientation of the tape surface blank 140 is reversed so that the bottom surface 146 containing the burr edge 142 is formed into the tape bearing surface 80. During the cold rolling process, the bottom surface 146 and the burr 142 are compressed and thinned so that a radius 160 is formed along the edge 144. The excess material from the burr 142 is compressed so that the radius 160 is less then the radius 154. The radius 144 is typically about 0.254 mm (0.001 inches). Consequently, the low air pressure region (high tape contact pressure) created along the radius 160 is significantly less then that created by the radius 154. Additionally, the radius 160 reduces the chance that the tape will contact the fracture edge located below the edge 144. The method of FIGS. 12A–12B is particularly suited for use with homogeneous materials, such as stainless steel.

Since the forming roller used in the cold rolling process generally contacts only the surface 146, a rough surface along the fracture edge that can potentially damage the tape may remain along the edge 144. Additionally, if the radius 160 is greater then 0.254 mm (0.010 inches), a low air pressure region (high tape contact pressure) can be created along the edge 144. The low air pressure region typically extends across the fill width of the edge 144. The low air pressure region along the radius 160 can cause non-uniform spacing between the tape bearing surface 80 and the tape. In some circumstances, the tape may impact on the rough surface at edge 144 and damage the tape.

The curved profile 88 on the tape guides 44, 45, 46 allows the tape 22 to travel with minimal contact along the bearing surface 80 as the tape rides on a self-acting air film. The tape 22 actually lifts off of the guides 44, 45, 46 by at least one micron in some cases. This is measured using a photonic sensor such as an MTI 1000 Fotonic™ Sensor using a 3808 module made by Mechanical Technology Inc. The curved profile provides a mechanism for hydrodynamic lift, as known from Reynold's equation, by creating a film of air under the tape 22 between the tape 22 and the tape guide. This is accomplished without resort to known systems such as air jets. The curved profile 88 also reduces the tape backside-to-tape guide friction, and reduces the drive force, thereby reducing the power dissipation. Preferably, the tape 22 will not contact the tape guides 45 at all, although the tape is expected to contact the guides at some points during operation. It is sufficient to achieve the above advantages that the tape 22 not contact the tape guides along most of the circumference of the tape guides 45.

Eliminating tape surface contact near the edges further reduces tape drag and consequently, shuffle-induced speed variations within the cartridge. Moreover, the range of tape tensions, that is, the difference between the maximum and minimum tape tensions from the beginning of the tape to the end of the tape are reduced. This reduction obviates the need for tape wrap pins in the cartridge.

The surface finish of the tape bearing surface 80 also can affect the performance of the cartridge 10, as different surface smoothness levels affect the level of air entrapment between the tape and the tape guide. If the finish is too rough, the tape may not fly above the larger asperities or peaks of surface roughness. A surface finish that is too smooth could result in degraded drive force performance at low tape speeds. Tests have shown that tape guides made of Type 303 stainless steel with the bearing surface polished using lapping film with a diamond grit of 3 microns and having a surface finish, measured with a Taylor-Hobson Talysurf-profilometer, ranging from 0.013 to 0.038 microns (0.5 to 1.5 micro-inches) in average roughness work well. Thus, if needed, the performance of the cartridge can be altered by selecting a tape guide radius or surface roughness to permit the desired level of air entrapment. The calendering process has been shown to improve the surface finish of the tape surface pieces 54. Consequently, the tape surface pieces 54 do not require polishing and a lower cost material may be used.

All patents and patent applications referred to above are hereby incorporated by reference.

It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

We claim:

1. A tape bearing surface for a tape, the tape having a boundary layer of air entrapped between the tape and the bearing surface upon movement of the tape, a flying height above the surface and a cross-web tension, the tape bearing surface comprising a stationary tape surface piece having a top surface with a longitudinal axis defining a tape path and a lateral axis perpendicular to the longitudinal axis, the top surface defining a convex shape extending along the lateral axis having at least two distinct radii, the respective radii being such as to minimize cross-web tension while minimizing friction and maintaining a predetermined flying height.

2. The tape bearing surface of claim 1 wherein the at least two distinct radii comprise a first radii proximate a center of the lateral axis and a second radii proximate edges of the lateral axis.

3. The tape bearing surface of claim 2 wherein the first radius is greater than the second radius.

4. The tape bearing surface of claim 2 wherein the first radius has a height in a range of about 6.0 microns to 8.0 microns.

5. The tape bearing surface of claim 2 wherein the second radius is in a range of about 19 microns to 21 microns.

6. The tape bearing surface of claim 1 wherein the at least two distinct radii comprises an elliptical shape.

7. The tape bearing surface of claim 1 wherein the at least two distinct radii comprises an parabolic shape.

8. The tape bearing surface of claim 1 wherein the tape surface piece has a width between 6.35 mm and 12.7 mm.

9. The tape bearing surface of claim 1 wherein the boundary layer of air comprises a self-acting air bearing extending along the top surface.

10. The tape bearing surface of claim 1 wherein the tape surface piece comprises chrome plated brass.

11. A tape guide including the tape bearing surface of claim 1.

12. A tape cartridge including the tape bearing surface of claim 1.

13. A tape bearing surface for a tape, the tape including a boundary layer of air entrapped between the tape and the bearing surface upon movement of the tape, a flying height above the surface and a cross-web tension, the tape bearing surface comprising a stationary tape surface piece having a top surface with a longitudinal tape travel axis defining a tape path and a lateral axis perpendicular to the longitudinal axis, the top surface defining a convex shape extending along the lateral axis having a height of between 12.7 to 25.4 microns (0.0005 and 0.001 inches) which will minimize cross-web tension while minimizing friction and maintaining a predetermined flying height.

14. The tape bearing surface of claim 13 wherein the convex shape has a height comprising between 12.7 and 20.3 microns.

15. The tape bearing surface of claim 13 wherein the convex shape has a height comprising between 17.8 and 20.3 microns.

16. A tape guide including the tape bearing surface of claim 13.

17. A tape cartridge including the tape bearing surface of claim 13.

18. The tape bearing surface of claim 13 wherein the boundary layer of air comprises a self-acting air bearing extending along the top surface.

* * * * *